United States Patent [19] [11] Patent Number: 4,948,071
Summers, III [45] Date of Patent: Aug. 14, 1990

[54] DEPLOYMENT SYSTEM FOR PARACHUTE
[75] Inventor: Clyde M. Summers, III, Cummings, Ga.
[73] Assignee: Glide Path International, Inc., Chamblee, Ga.
[21] Appl. No.: 337,087
[22] Filed: Apr. 12, 1989
[51] Int. Cl.⁵ .............................................. B64D 17/52
[52] U.S. Cl. .................................... 244/149; 244/152; 244/147
[58] Field of Search ............... 244/152, 149, 147, 142, 244/113

[56] References Cited
U.S. PATENT DOCUMENTS

| | | | |
|---|---|---|---|
| 2,513,867 | 7/1950 | Heffernan | 244/147 |
| 2,949,263 | 8/1960 | Steinthal | 244/147 |
| 3,009,673 | 11/1961 | Knacke | 244/147 |
| 3,198,458 | 8/1965 | Fink | 244/49 |
| 3,381,919 | 5/1968 | Girard | 244/149 |
| 3,540,684 | 11/1970 | Snyder | 244/149 |
| 4,399,969 | 8/1983 | Gargano | 244/149 |
| 4,664,342 | 5/1987 | Jones | 244/147 |
| 4,705,238 | 11/1987 | Gargano | 244/146 |

Primary Examiner—Joseph F. Peters, Jr.
Assistant Examiner—Christopher P. Ellis
Attorney, Agent, or Firm—Nixon & Vanderhye

[57] ABSTRACT

The deployment system includes a pilot chute and a bridle wherein the bridle is secured at one end to the forward portion of a parachute canopy. The bridle extends through a rear portion of the canopy. Prior to deployment, the deployment bag is packed such that the forward and rear portions of the canopy lie closely adjacent one another to fully extend the bridle pilot chute from the main canopy. Upon deployment, relative front-to-back opening forces of the parachute displace the front and rear portions of the parachute away from one another thereby drawing the bridle within the canopy and the pilot chute into a closely snugged location to the canopy.

19 Claims, 2 Drawing Sheets

DEPLOYMENT SYSTEM FOR PARACHUTE

BACKGROUND AND SUMMARY

The present invention relates to a deployment system for parachutes and particularly relates to apparatus and methods for deploying a main parachute canopy and a pilot chute, wherein the pilot chute is drawn up close to the main parachute canopy upon deployment of the main parachute and prevented from redeploying.

While the apparatus and methods described herein have principal application to and will be described in conjunction with a ram air parachute, it will be appreciated that the system is useful with other types of parachutes. As well known, ram air parachutes include a main parachute canopy having a plurality of laterally spaced, longitudinally extending cells, each cell being defined by upper and lower surfaces of the canopy and laterally spaced sidewalls. The cells are open at the front or leading edge of the canopy and closed at the rear or trailing edge of the canopy. After canopies of this type are deployed, they will occasionally collapse from side-to-side. That is, the multi-cell compartments will collapse in a lateral direction from the opposite ends of the canopy inwardly toward the center of the canopy. Upon collapse of the canopy in this manner, it is important to prevent the pilot chute from redeploying. This is particularly significant when parachutists jump and create a multi-canopy formation. In such formation, the canopies and jumpers are essentially vertically stacked one over the other, respectively, with the higher jumper positioned forwardly of the lower jumper's canopy and shroud lines. In the event of a collapse of one or more of the canopies in a multi-canopy formation, there is substantial danger that pilot chute may redeploy and, along with the bridle, become entangled with another parachute or with another jumper creating a situation requiring each or both of the jumpers to cut away their main canopies and resort to reserve chutes. It is therefore essential to prevent the pilot chute from redeploying subsequent to deployment of the main canopy.

In accordance with the present invention, there is provided a deployment system which draws the pilot chute toward the main canopy upon deployment of the main canopy. This action snugs the pilot chute close to the main canopy thereby preventing redeployment of the pilot chute, particularly upon collapse of the main canopy, and avoiding any entanglement of the pilot chute with adjacent parachutes and/or jumpers when used, for example, in multi-canopy formations. This is accomplished by using the relative front-to-rear opening forces of the parachute canopy, e.g., typical of ram air parachutes, to draw the pilot chute toward the main canopy. Also, the pilot chute is less likely to redeploy, e.g., upon collapse of the main parachute, due to the tendency in most ram air parachutes to collapse from side-to-side, i.e. from its opposite ends laterally inwardly toward the canopy center.

More particularly, the pilot chute of the present invention is connected to the main canopy in a central cell thereof by means of a bridle including a suspension line connected at its forward end, i.e., the end thereof remote from the pilot chute, to a forward portion of the main canopy. This connection is preferably effected by employing a reefing ring suitably secured to the underside of the upper main canopy surface within a forward portion of the central cell. The suspension line extends rearwardly within the central cell and passes through an opening in the upper surface of the main canopy adjacent a rear portion thereof for connection with the pilot chute. Preferably, the opening is defined by a grommet forming part of the parachute deployment bag.

Additionally, within the central cell of the main canopy, there is provided, in accordance with an aspect of the present invention, a sleeve secured preferably to the upper surface of the canopy and within the cell. The suspension line passes from the forward portion of the canopy through the sleeve for egress from the central cell through the grommet, the latter also extending through a wall of the sleeve. The sleeve protects the main parachute against the possibility of burning the parachute material during deployment.

To use the deployment system of the present invention, the canopy of the main parachute is packed in the deployment bag parachute is packed such that the bridle of the pilot chute including the suspension line is extended to its fullest extent from the canopy and the deployment bag. To accomplish this, the reefing ring is drawn up against the grommet on the deployment bag. This locates substantially the entirety of the bridle outside of the deployment bag. Thus, when the main parachute bag containing the deployment bag is opened, the pilot chute is caught in the air stream and fully extended to pull the deployment bag from the main parachute bag. When the shroud lines of the main canopy connected to the jumper's harness become taut, deployed. When the main canopy is deployed, the relative front-to-rear opening forces of the main parachute canopy cause the front and rear portions thereof to move away from one another. This movement causes the bridle including the suspension line to be drawn inwardly through the grommet into the central cell. This, in turn, draws the pilot chute toward the main canopy. The cotton sleeve protects the parachute material from burning. Consequently, by disposing the pilot chute directly adjacent and snugged up to the main canopy upon deployment of the latter, redeployment of the pilot chute, i.e., upon endwise collapse of the main parachute is readily prevented.

In a preferred embodiment according to the present invention, there is provided a canopy deployment system for a parachute, comprising a parachute canopy including forward and rear portions thereof and a pilot chute having a suspension line. Means are provided for securing one end of the suspension line to the forward portion of the canopy and for securing the opposite end of the suspension line to the pilot chute. Means are also provided adjacent the rear portion of the canopy which define a guide for receiving the suspension line and from which the pilot chute and a portion of the suspension line may extend prior to and upon deployment of the canopy, the suspension line securing means at the forward portion and the guide at the rear portion being spaced one from the other a predetermined distance relative to the suspension line such that front-to-back opening of the canopy upon deployment of the parachute relatively displaces the securing means and the guide away from one another to locate at least the major portion of the suspension line forwardly of the guide, thereby drawing the pilot chute into close proximity to the guide.

In a further preferred embodiment according to the present invention, there is provided a canopy deployment system for a ram air parachute, comprising a multi-cell ram air parachute canopy having relative front-to-back movement upon deployment thereof, a pilot chute and a suspension line connected to said pilot chute. Means are also provided for connecting the suspension line and the canopy one to the other for displacing the pilot chute toward the canopy in response to the front-to-back relative movement of said canopy upon deployment.

In a still further preferred embodiment according to the present invention, there is provided a method of deploying a parachute having a pilot chute attached to the canopy of the parachute by a suspension line, comprising the steps of securing one end of the suspension line to the canopy, securing the opposite end of the suspension line to the pilot chute, deploying the parachute with relative front-to-back opening movement of the canopy and displacing the pilot chute in a direction toward the canopy in response to the relative front-to-back movement whereby the pilot chute is drawn into close proximity to the canopy upon deployment of the parachute.

Accordingly, it is a primary object of the present invention to provide novel and improved apparatus and methods for deploying the main canopy of a parachute using a pilot chute wherein the pilot chute is drawn toward the main canopy upon deployment thereof to prevent redeployment of the pilot chute upon endwise collapse of the main parachute canopy.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to the present preferred embodiment of the invention, an example of which is illustrated in the accompanying drawings.

Figure 1:
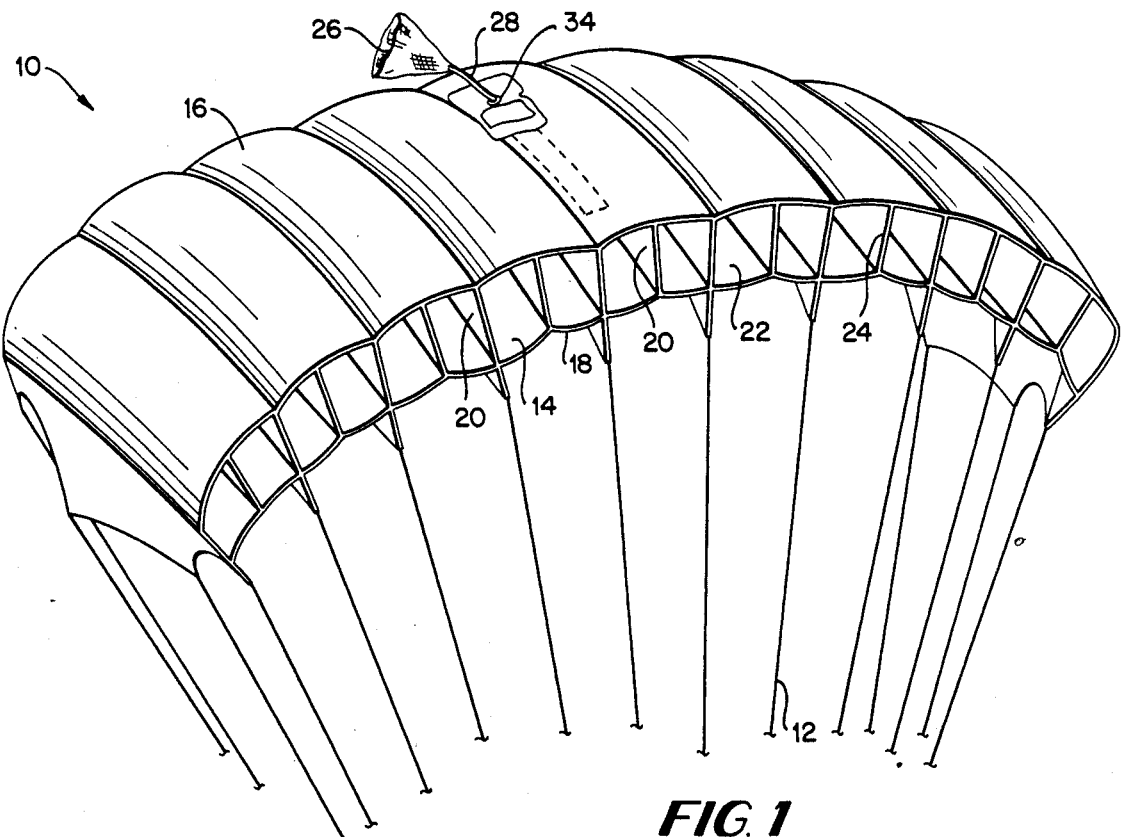
FIG. 1 is a fragmentary perspective view illustrating a fully deployed main parachute canopy with the pilot chute therefor drawn up snug to the main canopy.

Referring now to the drawing Figures, particularly to FIG. 1, there is illustrated a parachute canopy generally designated 10 having a plurality of shroud lines 12 for connection to the jumper's harness, not shown. While the illustrated parachute canopy is a ram air canopy, it will be appreciated that other types of canopies may be employed in conjunction with the present invention. Ram air parachute canopy 10 is of conventional construction except with respect to the pilot chute deployment system hereof. Particularly, canopy 10 has a plurality of cells 14 defined by upper and lower canopy surfaces or panels 16 and 18 and laterally spaced sidewalls 20. Each cell 14 is further divided into a pair of cell pockets 22 by a longitudinally extending rib 24. The open end of the cells 14 define the leading or forward edge of main canopy 10 and the opposite ends of the cells 14 at the trailing or rear portion of the canopy are closed. In FIG. 1, a pilot chute is connected by a bridle 28 including a suspension line 30 to the main parachute canopy in a manner as will now be described.

Figure 2:
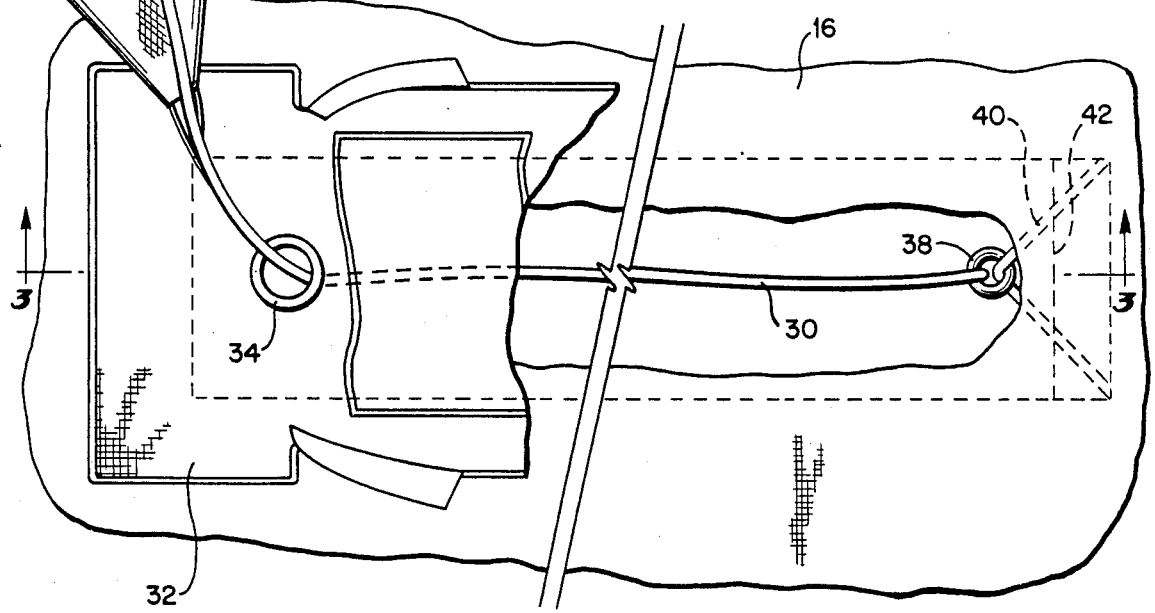
FIG. 2 is an enlarged top view of a portion of the central cell of the main canopy with parts broken out for ease of illustration showing the connection between the pilot chute and the main canopy.
Figure 3:
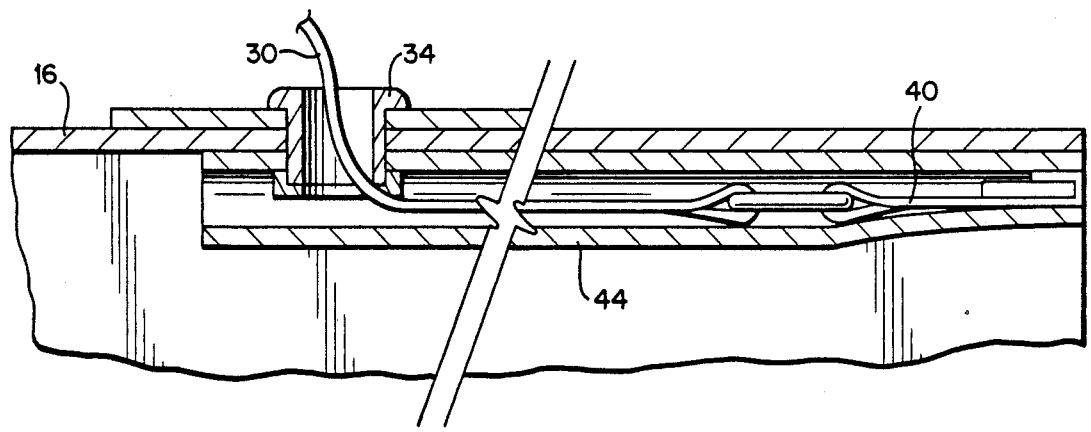
FIG. 3 is a cross-sectional view thereof with parts broken out taken generally about on line 3—3 of FIG. 2.
Figure 4:
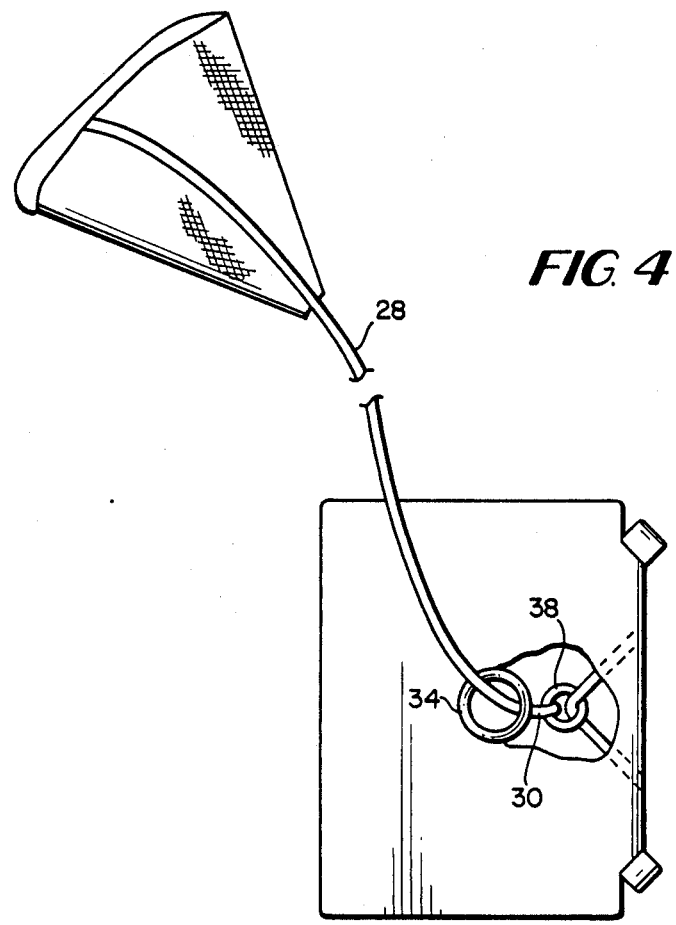
FIG. 4 is a plan view of the deployment bag illustrating the connection of the suspension line to the main canopy and that connection drawn up to the grommet when the main parachute is packed prior to deployment.

Referring now to FIG. 2, there is illustrated a deployment bag suitably connected to the upper surface 16 of main canopy 10 by means including a grommet 34 (see FIG. 3). The deployment bag 32 in FIGS. 1 and 2 is illustrated in a fully open condition. Bag 32 is connected to a central or medial cell 14 of canopy 10 on the outside of the panel 16 forming part of one of the pockets 22 of central cell 14. The grommet 34 is located in the rear portion of the main canopy and opens into the pocket 22 of central cell 14. The pilot chute 26 is secured to the main canopy by securing suspension line 30 adjacent the leading edge or forward portion of canopy 10. Preferably, this connection is provided by a reefing ring 38 through which a webbing 40 passes. Webbing 40 is, in turn, secured, for example by stitching, to a reinforcing webbing 42 secured again, for example by stitching, to the underside of the upper canopy 16. Consequently, the bridle including the suspension line 30 is secured at its forward end to the reefing ring 38 and passes through the grommet 34 for connection to the pilot chute 26.

Preferably, the bridle is formed of a nylon material. To prevent burning of portions of the main canopy upon deployment thereof and relative movement between the bridle of the chute and the canopy as described hereinafter, a cotton sleeve 44 is secured in the pocket 22 of central cell 14. More particularly, cotton sleeve 44 is secured, for example, by stitching along the underside of the upper panel 16 of the main canopy. The sleeve is closed at its forward end and encompasses reefing ring 38 and the bridle including the suspension line 30. Sleeve 44 extends rearwardly toward the trailing edge and beyond grommet 34. Grommet 34 also passes through the sleeve so that the bridle in the sleeve may pass through the grommet. Thus, relative movement between the bridle and canopy provides for frictional movement between the bridle and sleeve 44 rather than between the conventional nylon fabric of the canopy panels and the bridle.

When the deployment bag is packed, the main canopy is appropriately folded and disposed in the bag. The bag has releasable fasteners along its sides and a locking loop, not shown, whereby the bag may be laid out flat. In packing the parachute in the deployment bag, the bridle and pilot chute 26 are fully extended from the deployment bag such that reefing ring 38 is drawn up and bears against the grommet 34. Preferably, the bag has a pouch along its underside in which the suspension or shroud lines and control lines may be stowed. The suspension lines are, of course, coupled to the jumper's harness and the deployment bag is disposed in a parachute pack, not shown, carried by the jumper.

In use, it will be appreciated that, when the jumper opens the parachute bag, the pilot chute is freed for deployment into the air stream. Thus, the pilot chute draws the deployment bag 32 containing the main canopy 10 from the parachute pack fully extending the suspension and control lines between the deployment bag and the jumper's harness. When those lines become taut, the main folded canopy is withdrawn from the deployment bag and deploys. It will be appreciated that in certain types of parachutes, for example, the ram air parachute, the deployment of the main canopy includes relative front-to-rear opening forces. That is, the forces tending to deploy the canopy 10 cause the front portion or leading edge of the canopy and the rear portion thereof or trailing edge to move away from one another. As a consequence of this opening movement, the reefing ring 38 and grommet 34 are displaced away from one another causing the bridle 30 to be drawn into the cotton sleeve 44. This action in turn draws pilot chute 26 toward the main canopy 10 into a final position, as illustrated in FIG. 2, where chute 26 is snugged up to grommet 34 and importantly to the main canopy 10.

It will be appreciated that the deployment of the main canopy causes frictional engagement between the bridle and the interior of the sleeve as the bridle is drawn into the sleeve. However, because the sleeve is formed of a cotton material, insufficient heat is generated by this frictional contact to cause any burning of the canopy panels.

In this manner, the pilot chute and bridle are drawn toward the main canopy upon deployment and, upon full deployment, the bridle is substantially located within the central cell of the canopy with the pilot chute drawn up snug against grommet 34. Consequently, any collapse of the parachute which, in ram air parachutes, normally starts at its opposite lateral ends and is directed inwardly, does not cause redeployment of the pilot chute or in any way enable the bridle and pilot chute to extend further away from the main canopy. Thus, the danger of entanglement of the pilot chute or its bridle with other jumpers or their chutes, for example, when employing a multi-canopy formation, is substantially minimized or eliminated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A canopy deployment system for a parachute, comprising:
    a parachute canopy including forward and rear portions thereof;
    a pilot chute having a suspension line;
    means for securing one end of said suspension line to said forward portion of said canopy;
    means for securing the opposite end of said suspension line to said pilot chute;
    means adjacent said rear portion of said canopy defining a guide for receiving said suspension line and from which said pilot chute and a portion of said suspension line may extend prior to and upon deployment of said canopy, said suspension line securing means at said forward portion and said guide at said rear portion being spaced one from the other a predetermined distance relative to said suspension line such that front-to-back opening of said canopy upon deployment of the parachute relatively displaces said securing means and said guide away from one another to locate at least the major portion of said suspension line forwardly of said guide, thereby drawing the pilot chute into close proximity to said guide.

2. A system according to claim 1 wherein said canopy includes a canopy surface, said securing means connected to said canopy such that said suspension line extends at least in part along the underside of said canopy surface toward said guide.

3. A system according to claim 2 wherein said guide includes an opening formed through said canopy surface and said suspension line extends through said opening.

4. A system according to claim 1 including a sleeve extending in a front-to-back direction, means for securing said sleeve and said canopy one to the other, said suspension line extending through said sleeve.

5. A system according to claim 4 wherein said sleeve is formed of a cotton material substantially insulating the suspension line from the material forming the canopy thereby substantially eliminating or minimizing the danger of burning the canopy in response to relative movement between said suspension line and the canopy.

6. A system according to claim 3 including a sleeve extending in a front-to-back direction, means for securing said sleeve along the underside of said canopy surface, said suspension line extending through said sleeve.

7. A system according to claim 6 wherein said securing means includes a reefing ring secured to said canopy surface and said opening is defined by a grommet in said canopy surface.

8. A system according to claim 1 wherein said parachute canopy comprises a multi-cell ram air canopy, said cells being laterally spaced one from the other and defined in part by upper and lower canopy surfaces and spaced lateral walls, said cells being open at said front portion of said canopy.

9. A system according to claim 8 wherein said securing means lies within a central cell of said multiple cells such that said suspension line extends in said central cell toward said guide, said guide including an opening extending through said upper surface of said central cell and said suspension line extending through said opening.

10. A system according to claim 9 including a sleeve in said central cell extending in a front-to-back direction, means for securing said sleeve and said upper canopy surface one to the other, said suspension line extending from said securing means through said sleeve.

11. A canopy deployment system for a ram air parachute, comprising:
    a multi-cell ram air parachute canopy having relative front-to-back movement upon deployment thereof;
    a pilot chute;
    a suspension line connected to said pilot chute; and
    means connecting said suspension line and said canopy one to the other for displacing said pilot chute toward said canopy in response to said front-to-back relative movement of said canopy upon deployment.

12. A system according to claim 11 wherein said connecting means includes means connecting one end of said suspension line to a forward portion of said canopy and within a central cell of said canopy together with means adjacent a back portion of said canopy for guiding said suspension line from said central cell outwardly of said canopy.

13. A system according to claim 12 including a sleeve disposed within said central cell and extending in a front-to-back direction, said suspension line extending through said sleeve.

14. A system according to claim 13 including means for securing said sleeve along the underside of said canopy surface and including a reefing ring secured to said canopy, said guiding means including an opening through said canopy adjacent said back portion thereof.

15. A method of deploying a parachute having a pilot chute attached to the canopy of the parachute by a suspension line, comprising the steps of:
   securing one end of the suspension line to the canopy;
   securing the opposite end of said suspension line to said pilot chute;
   deploying the parachute with relative front-to-back opening movement of said canopy; and
   displacing the pilot chute in a direction toward said canopy in response to said relative front-to-back movement whereby the pilot chute is drawn into close proximity to said canopy upon deployment of the parachute.

16. A method according to claim 15 including the steps of securing the one end of the suspension line to a forward portion of the canopy and guiding the suspension line through a rear portion of the canopy such that opening movement of said canopy displaces the one end of the suspension line and the rear portion of the canopy through which the suspension line is guided relatively away from one another.

17. A method according to claim 16 including the steps of securing a sleeve to the canopy and extending the suspension line through the sleeve in a generally rearward direction away from the securement of the one end to the canopy.

18. A method according to claim 16 including the steps of providing a multi-cell ram air parachute canopy, locating the suspension line within a central cell thereof, securing a sleeve to the canopy within said central cell thereof, and extending said suspension line through said sleeve.

19. A method according to claim 15 including the steps of guiding the suspension line adjacent a rear portion of said canopy, and locating, prior to deployment of said parachute, the one end of said suspension line closely adjacent the rear portion of said canopy through which the suspension line is guided to enable relative displacement thereof away from one another upon deployment of said parachute, said canopy surface and said opening being defined by a grommet in said canopy surface.

* * * * *